Nov. 3, 1964   H. B. HUMMER   3,155,393
SEALED QUENCH COLLAR
Filed Dec. 19, 1962
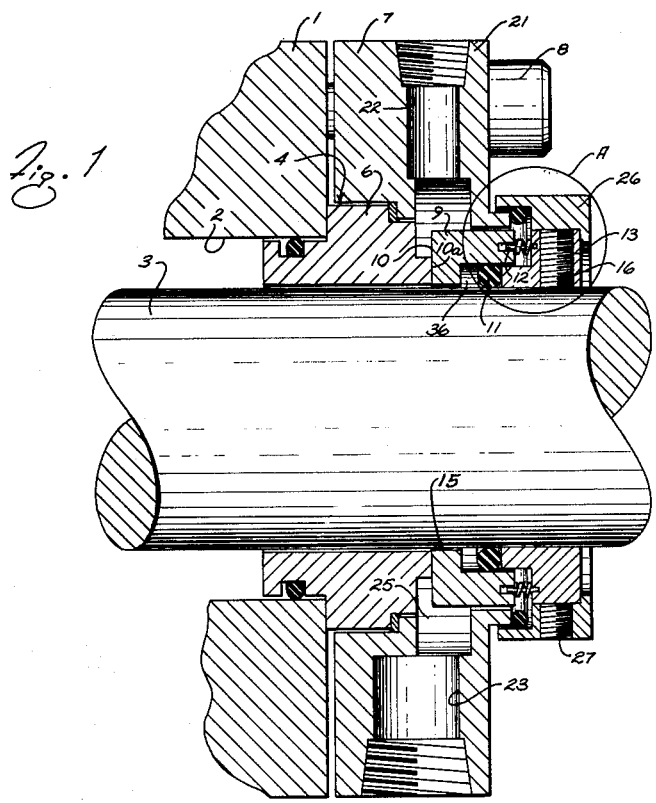
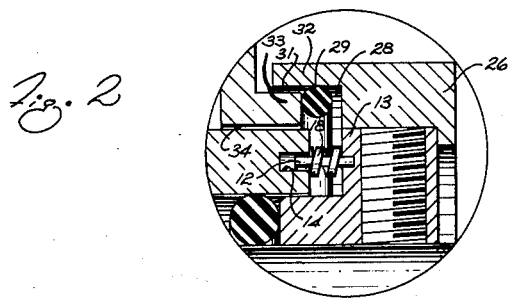
INVENTOR.
HERBERT B. HUMMER
BY
ATTORNEYS

United States Patent Office 3,155,393
Patented Nov. 3, 1964

3,155,393
SEALED QUENCH COLLAR
Herbert B. Hummer, Pavilion, Mich., assignor to Durametallic Corporation, Kalamazoo, Mich., a corporation of Michigan
Filed Dec. 19, 1962, Ser. No. 245,863
6 Claims. (Cl. 277—74)

This invention relates to a seal of the so-called "outside" type, having means to make possible the use with the seal of a larger volume of quenching, absorbing, cooling or other controlling liquid than has previously been possible, particularly where appreciable leakage of such liquid cannot be permitted.

While the apparatus of the invention is applicable to a wide range of devices wherein a rotatable shaft extends through a wall, said wall usually being a portion of a closed vessel in which a fluid pressure is created, it is particularly adaptable to such devices as pumps or autoclaves. Accordingly, for the purposes of discussion, reference will be made hereinafter to the use of such invention with pumps. Such specific reference will, however, be clearly understood as being illustrative only and importing no limitation in the use or applicability of the invention.

Mechanical seals for rotating shafts, such as in or with the stuffing box of a centrifugal pump, normally are grouped into either of two well-known classes, which classes are commonly termed "inside seals" or "outside seals" depending on whether the sealing faces thereof are inside of or outside of the stuffing box of the equipment being sealed. In the earlier years of the development of these seals, the outside seals were considered more convenient from the standpoint of installation, inspection and servicing while the inside seals, for reasons well understood by those skilled in the art, were more satisfactory from such standpoints as lubrication, capacity to withstand high pressures and temperature control.

Although these concepts were at one time considered well established, the advantages of the outside type of seal were sufficiently attractive that development work continued on them and several improvements have been made. One improvement has been the so-called "balanced outside seal" which has many advantages from the standpoint of its ability to withstand higher pressures than were formerly acceptable. However, this development did not appreciably solve certain problems of temperature control, wear or gas leakage from equipment pumping gases inasmuch as the pump liquid introduced into the rotating sealing ring of the balanced outside seal was not a flowing liquid.

Such control over the temperature of the sealing members is particularly desirable wherever the sealing faces would otherwise generate or be subjected to high temperatures. Examples of such use include pumps handling hot liquids such as hot water or hot heat transfer liquids or conditions of high friction between the sealing faces such as conditions of high pressures or where the pump is handling a dry gas.

To handle these and other problems, another improvement has been to cause a quantity of liquid, sometimes called a "quench" liquid, to flow around and in contact with the sealing members of an outside type of seal.

This technique substantially improved the ability of an outside seal to meet the problems above mentioned but also created still further problems in that a seal now had to be provided between the rotating portion associated with the rotating seal ring of the seal and the housing through which the quench liquid was circulated around and in contact with said rotating sealing member. In the past, the art has used merely an inadequate labyrinthine relationship between said rotating sealing member and said housing in the belief that a more sophisticated sealing means at this point would make the entire device unreasonably complex. However, the use of such labyrinthine relationship meant that only a minimum of pressure and thus a very low flow rate could be permitted to exist within the quench liquid for otherwise same would escape through the labyrinth establishing said labyrinthine relationship. Thus, the temperature control and other benefits obtained by use of the quench liquid were somewhat limited and the full potentials of an outside seal construction, even those of the so-called balanced construction, were still not obtainable.

Accordingly, the objects of the invention include:

(1) To provide fluid-tight means for supplying a fluid, for temperature control and other purposes, to the external rotating part of a so-called "outside seal" mechanical sealing assembly, said assembly operating between a rotatable shaft and a wall through which said shaft extends.

(2) To provide means, as aforesaid, including a fluid-conducting housing surrounding at least a portion of the rotating part of an outside-seal type of mechanical sealing assembly wherein very simple means are provided for minimizing, or substantially preventing, the escape of such fluid between said housing and said rotating member.

(3) To provide means, as aforesaid, wherein sufficiently large volumes of quench liquid can be used with a mechanical seal of the outside type as to render it almost as versatile and effective in operation as a seal of the inside type while maintaining the inherent advantages of outside mechanical seals from the standpoint of easier installation, easier inspection and easier maintenance.

(4) To provide means, as aforesaid, which can be converted from a condition of only minor leakage, which will be acceptable for many uses, to a condition of no discernible leakage at all, as will be required for other uses, by the addition of a simple part which addition can be made easily and inexpensively.

(5) To provide means, as aforesaid, which will involve relatively little additional maintenance problems.

(6) To provide means, as aforesaid, which will be appropriate for use either with an independently pressurized external pressure system or with pressure supplied from the interior of the equipment with which such seal is being used.

(7) To provide means, as aforesaid, which can be provided at a relatively low original cost.

Other objects and purposes of the invention will be apparent to persons acquainted with devices of this general type upon reading the following disclosure and inspecting the accompanying drawings.

In the drawings:

FIGURE 1 is a central sectional view of a mechanical seal embodying the invention.

FIGURE 2 is an enlarged fragment of the portion of FIGURE 1 indicated at A therein.

General Description

In general the invention comprises providing a pressure-containing jacket enclosing the relatively rotatable portions of said seal, said jacket being made in two parts. One of such parts is nonrotatably related to the wall above mentioned and the other part of said jacket defines a chamber and is arranged for rotation with the rotating portions of said seal. Said two parts are provided with a labyrinthine relationship with each other. A loose ring, preferably of an elastomeric material, is provided of a radial thickness and outside diameter substantially equal to that of one of the passageways of said labyrinth and positioned to respond to a pressure within said chamber for blocking said labyrinthine passageway thereby to block exit of pressure fluid from within said chamber.

Detailed Description

Referring now to the drawings, there is shown a wall 1 which may for illustration here be taken as the wall of a centrifugal pump, autoclave, turbine or other generally similar equipment having an opening 2 through which extends a rotatable shaft 3.

Operatively arranged between said wall 1 and said shaft 3 is a mechanical seal, generally indicated at 4, embodying the invention.

In the particular seal 4 here utilized to illustrate the invention there is provided a nonrotating sealing member 6, usually made of bronze, carbon or other low-friction material, which is nonrotatably affixed to a mounting member 7 of any convenient material, such as steel, which is in turn fastened rigidly to the wall 1 by any convenient means, such as screws of which one is indicated at 8.

A rotating sealing ring 9, usually made from a wear-resistant material, such as steel, and having a sealing surface 10 which often is hardened, encircles the shaft 1. The sealing surface 10 bears against the adjacent sealing surface 10a of the nonrotating sealing member 6. Said rotating sealing member 9 is usually made with a clearance 15 over the shaft 3 in a well-known manner to provide a slightly floating relationship between said rotating sealing member and said shaft 3 for the purpose of maintaining alignment between the two sealing members and for the purpose of providing a passage for the fluid being handled to enter the chamber 36 for pressure-balancing purposes in an already well-known manner. The sealing member 9 is sealed with respect to the shaft by an O-ring 11. The rotating sealing member 9 is caused to rotate with the shaft 3 by any suitable means which are here shown as being a plurality of drive pins, of which one appears at 12, seated in a collar 13 and extending into suitable openings 14 in said rotating sealing member. Said collar 13 is fixed rigidly to the shaft 3 for rotation therewith by any convenient means, such as a set screw 16. The rotating sealing member 9 is urged against the nonrotating sealing member 6 in part mechanically by any convenient and known means, which are here indicated as being a plurality of springs 18 which are compressed between the rotating sealing member 9 and the collar 13 and in part by fluid pressure exerted as above mentioned within the chamber 36 by fluid entering thereinto from the pump through the clearance 15.

It will be recognized by those skilled in the art that all of the foregoing-described seal structure is conventional and may be varied widely within the scope of the invention. It is set forth here in some detail solely for background purposes and to insure a clear understanding of the following-described portion thereof wherein the substance of the invention is embodied.

A pressure-containing jacket is provided herein and is comprised of two parts; a first, nonrotating, jacket part 21 is fixed to and, as shown, is preferably integral with the mounting member 7. Said nonrotating jacket part has an inlet opening 22 therein which communicates with the annular zone 25 around the nonrotating sealing member 6 and the rotating sealing member 9. The jacket part 21 also has an outlet opening 23 communicating with the zone 25. The radially inner edge of the nonrotating jacket part 21 is spaced slightly from the radially outer surface of the rotating sealing member 9 to provide an opening 34 therebetween.

A rotating jacket part 26 is fixed to the collar 13 by any convenient means, such as the set screw 27. The jacket part 26 is axially spaced from the nonrotating jacket part 21 to define an annular chamber 28. The chamber 28 houses therein an elastomeric ring 29 which bears snugly against the radially outer wall of said chamber and which is capable of axial movement therewithin. Said chamber 28 is of small axial extent so that said ring 29 is always relatively close to the leftward side of said chamber for reasons appearing hereinafter. The leftward extremity of the rotating jacket part 26 and the rightward extremity of the nonrotating jacket part 21 have overlapping, axially extending, annular flanges 32 and 33, respectively, which are spaced radially slightly from each other and form therebetween an annular passage 31 which communicates between the leftward side of the chamber 28 near said ring and the atmosphere.

Operation

Although somewhat indicated above, the operation of the embodiment of the invention hereinabove discussed will now be described to assure a clear understanding of the invention. Fluid of any desired type is admitted through the inlet opening 22 and is exhaustible through the outlet opening 23 wherein the relative rate of flow in and out may be adjusted by any convenient means, not shown, to maintain the desired conditions of operation of said seal, which conditions usually pertain to temperature control requirements but which may also include other features mentioned above. Said fluid also passes through the opening 34 between the nonrotating jacket part 21 and the rotating sealing member 9 into the annular chamber 28. Upon being filled with fluid the chamber 28 is under pressure greater than atmospheric pressure whereas the passage 31 is only under atmospheric pressure. The elastomeric ring 29 is forced, by the pressure differential existing between the pressure in the passage 31 and the pressure in the chamber 28, into contact with the surfaces defining the rightward end of the passage 31 thereby sealing said chamber from said passage before appreciable fluid can escape from the chamber 28 through the passage 31. It will be noted that because of its proximity to the passage 31 only a small pressure differential is required to move the ring 29 into its sealing position and it will also be noted that the force with which the elastomeric ring 29 seals the chamber 28 from the passage 31 will be proportional to the difference in the pressures within said chamber and said passage. Thus, a satisfactory seal is obtained without undue wear on the elastomeric ring 29 caused by the relative rotation of the jacket parts 21 and 26 against which said elastomeric ring bears.

The particular embodiment herein utilized to illustrate the invention assumes that a low pressure at the inlet 22 will be sufficient to provide the desired throughput of quenching liquid and hence only a low pressure will exist within the chamber 28. This means that the ring 29 is urged against the relatively moving surfaces adjacent thereto by only a light pressure and will consequently have only a very small rate of wear. In the experimental work carried out thus far in connection with this invention, the ring 29 wore at a lesser rate than that of the sealing members 6 and 9 themselves and hence the use of this ring is not a factor affecting the total useful life of a given sealing assembly. It is conceivable, however, that where a higher throughput of quenching liquid is required between the opening 22 and the exit 23, a somewhat higher pressure can be utilized with no disadvantageous results excepting a higher wear rate for the ring 29.

While the foregoing example has utilized an outside seal of the balance type for illustrating the invention, it will be recognized that the quench technique and means of the invention will be equally applicable to outside seals not utilizing balancing means (i.e., where the chamber 36 is omitted) without changing either the principles of the invention or the apparatus required for carrying it out.

Although a particular embodiment of the invention has been hereinabove described in detail for illustrative purposes, it will be recognized that variations or modifications of such disclosure, which lie within the scope of the appended claims, are fully contemplated.

What is claimed is:

1. In mechanical seal construction for use between a wall and a shaft extending therethrough and rotatable relative thereto, wherein said mechanical seal has a pair of sealing members having mutually contacting sealing faces, one sealing member being fixed with respect to said wall and the other sealing member being capable of rotation in response to rotation of said shaft, the improvement comprising:

enclosure means defining a chamber surrounding said seal, a first portion of said enclosure means being rotatable with said other sealing member and a second portion of said enclosure means being fixed with respect to said wall, said first and second portions of said enclosure means including wall means defining an annular passageway extending away from said chamber;

a ring of external diameter substantially equal to the external diameter of said annular passageway and located within said chamber adjacent said passageway, said ring being of greater radial width than said passageway; and means for introducing a fluid pressure into said chamber of said enclosure means, whereby said pressure will urge said ring against the walls defining said passageway and seal said fluid pressure against escape from within said chamber.

2. The mechanical seal construction of claim 1 wherein said ring is of elastomeric material.

3. The mechanical seal construction defined in claim 1, including means associated with the first portion of said enclosure means for guiding said ring into sealing relationship with the walls defining said passageway.

4. The mechanical seal construction defined in claim 1, including means for holding said ring generally in the region of said passageway.

5. The mechanical seal construction defined in claim 1, in which said first and second portions of said enclosure means have annular, axially extending, overlapping flanges which are radially spaced from each other to define said passageway and said first enclosure portion has an axial end wall of said chamber spaced from the adjacent end of said flange of said second enclosure portion a distance only slightly greater than the axial thickness of said ring.

6. The mechanical seal construction of claim 4, in which a further passageway is provided between said other sealing member and said second portion of said enclosure means, means defining an annular zone around said sealing faces and communicating with said further passageway; and said means for introducing fluid pressure into said chamber including conduit means for flowing fluid through said zone.

References Cited in the file of this patent
UNITED STATES PATENTS

| | | |
|---|---|---|
| 2,797,940 | Michener et al. | July 2, 1957 |
| 2,894,769 | Richmond et al. | July 14, 1959 |
| 3,068,801 | Murray | Dec. 18, 1962 |